United States Patent
Tsai (10) Patent No.: US 7,261,381 B2
(45) Date of Patent: Aug. 28, 2007

(54) SEAT WITH MULTIPLE RETAINING FRAMES

(76) Inventor: Chih-Yi Tsai, Suite 3, Fl. 12, No. 12, Lane 101, Chih-Shang Rd., Taichung (TW)

( * ) Notice: Subject to any disclaimer, the term of this patent is extended or adjusted under 35 U.S.C. 154(b) by 0 days.

(21) Appl. No.: 10/940,721

(22) Filed: Sep. 15, 2004

(65) Prior Publication Data

US 2006/0055228 A1    Mar. 16, 2006

(51) Int. Cl.
*B60N 2/26* (2006.01)
(52) U.S. Cl. .................. 297/488; 297/238; 297/467
(58) Field of Classification Search ............. 297/238, 297/487, 488, 467, 250.1
See application file for complete search history.

(56) References Cited

U.S. PATENT DOCUMENTS

| | | | | |
|---|---|---|---|---|
| 3,899,042 A | * | 8/1975 | Bonar | 297/487 |
| 4,749,229 A | * | 6/1988 | Dorto | 297/238 |
| 4,756,573 A | * | 7/1988 | Simin et al. | 297/250.1 |
| 4,913,498 A | * | 4/1990 | Forlivio | 297/488 |
| 4,943,112 A | * | 7/1990 | Law | 297/238 |
| 5,004,253 A | * | 4/1991 | Nakao et al. | 297/488 |
| 5,100,199 A | * | 3/1992 | Vander Stel et al. | 297/238 |
| 5,449,223 A | * | 9/1995 | Miculici et al. | 297/484 |
| 6,626,492 B1 | * | 9/2003 | Uno | 297/238 |
| 2002/0195868 A1 | * | 12/2002 | Tsai | 297/487 |

* cited by examiner

*Primary Examiner*—Peter R. Brown
(74) *Attorney, Agent, or Firm*—Rosenberg, Klein & Lee (57) ABSTRACT

A seat includes a seat portion and a backrest. A plurality of U-shaped retaining frames of different sizes are pivotably connected to the backrest and sized such that a larger retaining frame encloses a smaller retaining frame. The individual retaining frame can be pivoted away from the backrest according to the users of different sizes.

9 Claims, 8 Drawing Sheets

SEAT WITH MULTIPLE RETAINING FRAMES

FIELD OF THE INVENTION

The present invention relates to a seat with a plurality of retaining frames of different sizes so as to meet requirements of different users.

BACKGROUND OF THE INVENTION

Conventional car seats generally include a body with a recess defined in one side thereof and a retaining frame which generally is a U-shaped frame is pivotably connected to the car set so as to further retain the child in the car seat. The car seats are secured by safety belts of vehicles. The car seats usually are emphasized for its safety feature, tough material and side functions such as cup holders or even toys hanged on the retaining frames. However, all the existed car seats have a fixed size which cannot be adjusted along with different users. For children, they grow so fast that the car seats with a fixed size have to be replaced with larger ones and this costs a lot of money and how to discard the bulky car seats is a problem in some areas, such as the problem of the space for the trash and the pollution of environments.

The present invention intends to provide a seat that includes multiple retaining frames which are pivotably connected to the backrest and can be pivoted individually according to the users of different sizes.

SUMMARY OF THE INVENTION

The present invention relates to a seat that comprises a seat portion and a backrest. A plurality of retaining frames of different sizes are pivotably connected to the backrest such that one of the retaining frames can be chosen and pivoted to fit the user.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
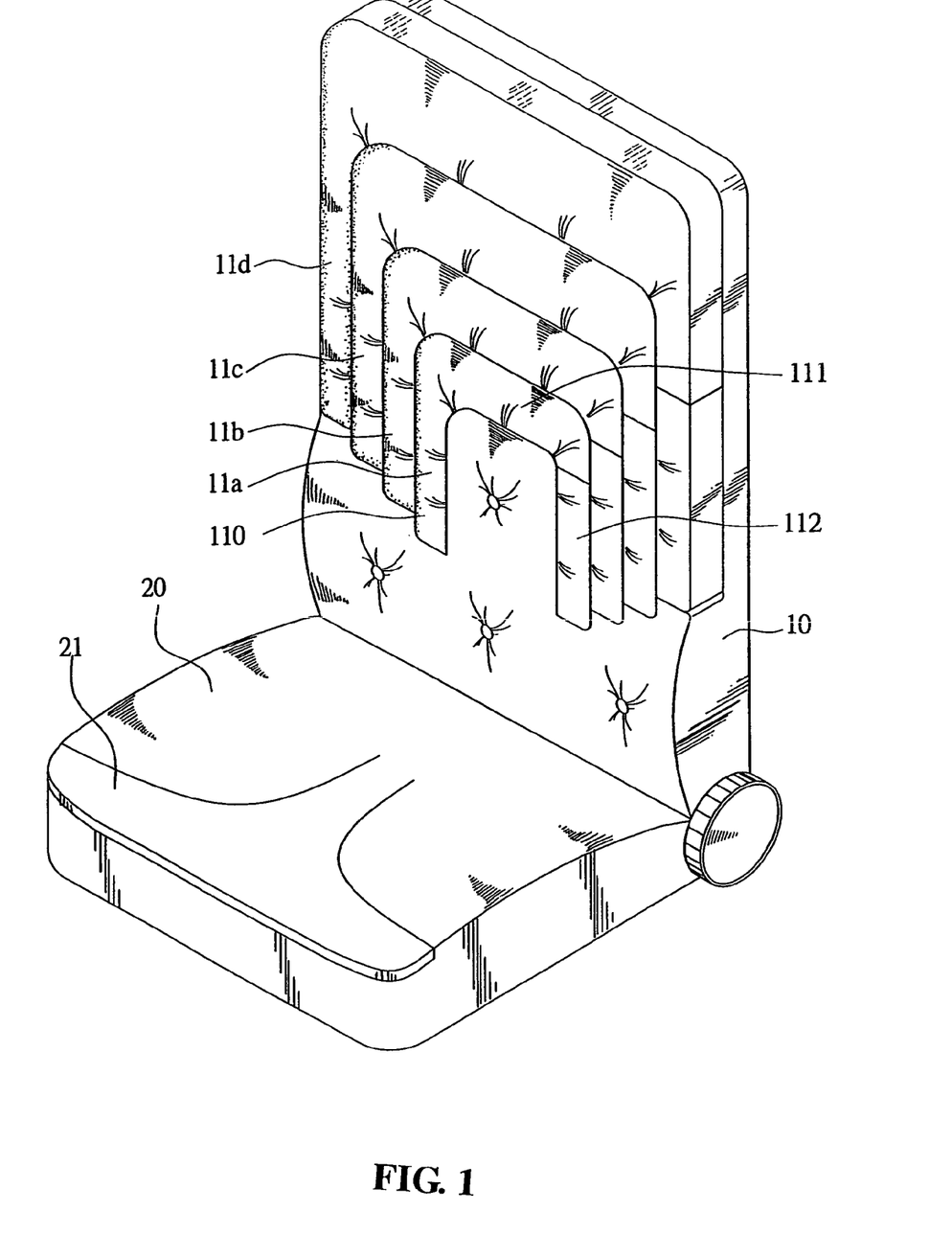
FIG. 1 is a perspective view to show the seat of the present invention.
Figure 2:
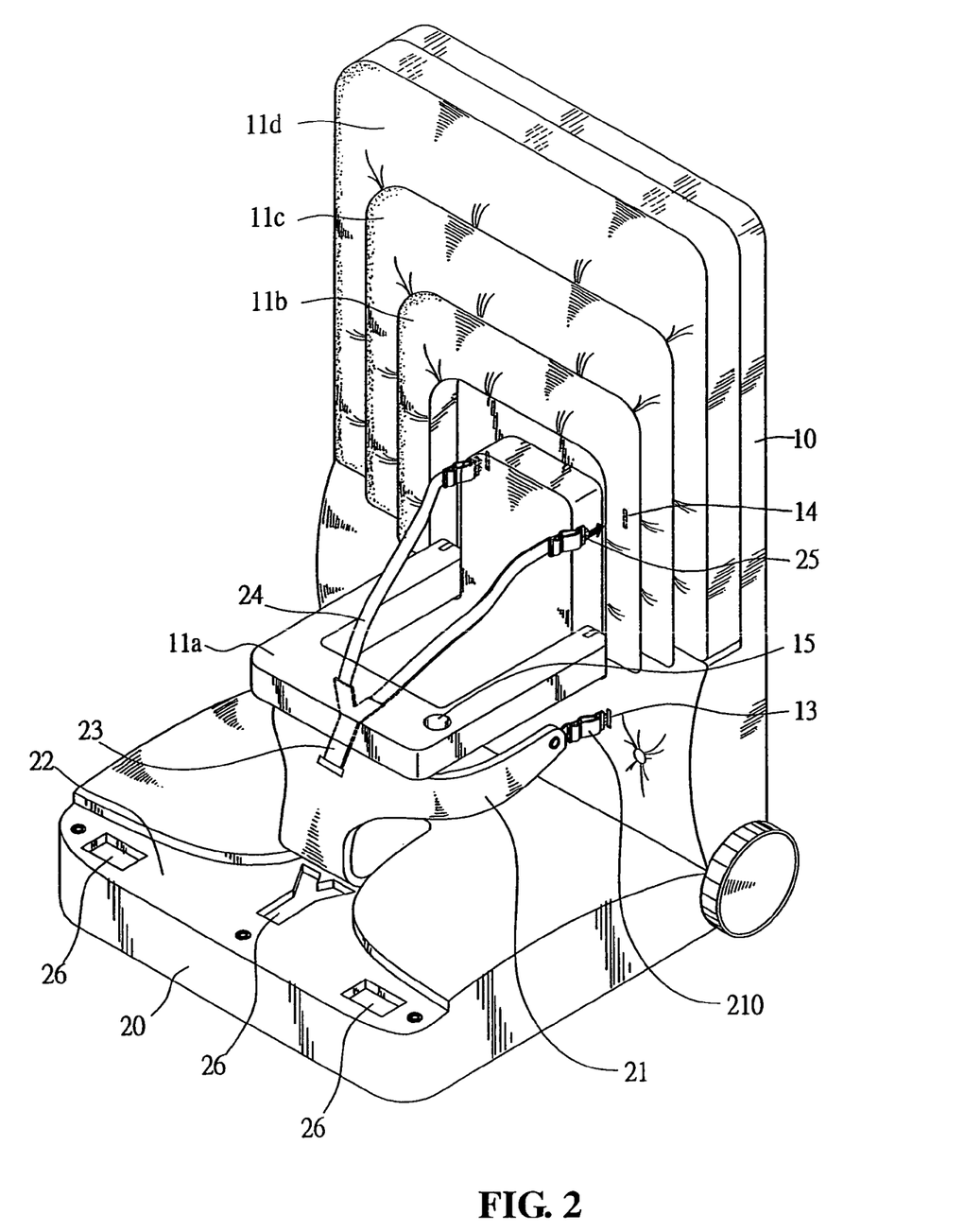
FIG. 2 shows that a first retaining frame is pivoted away from the backrest.
Figure 3:
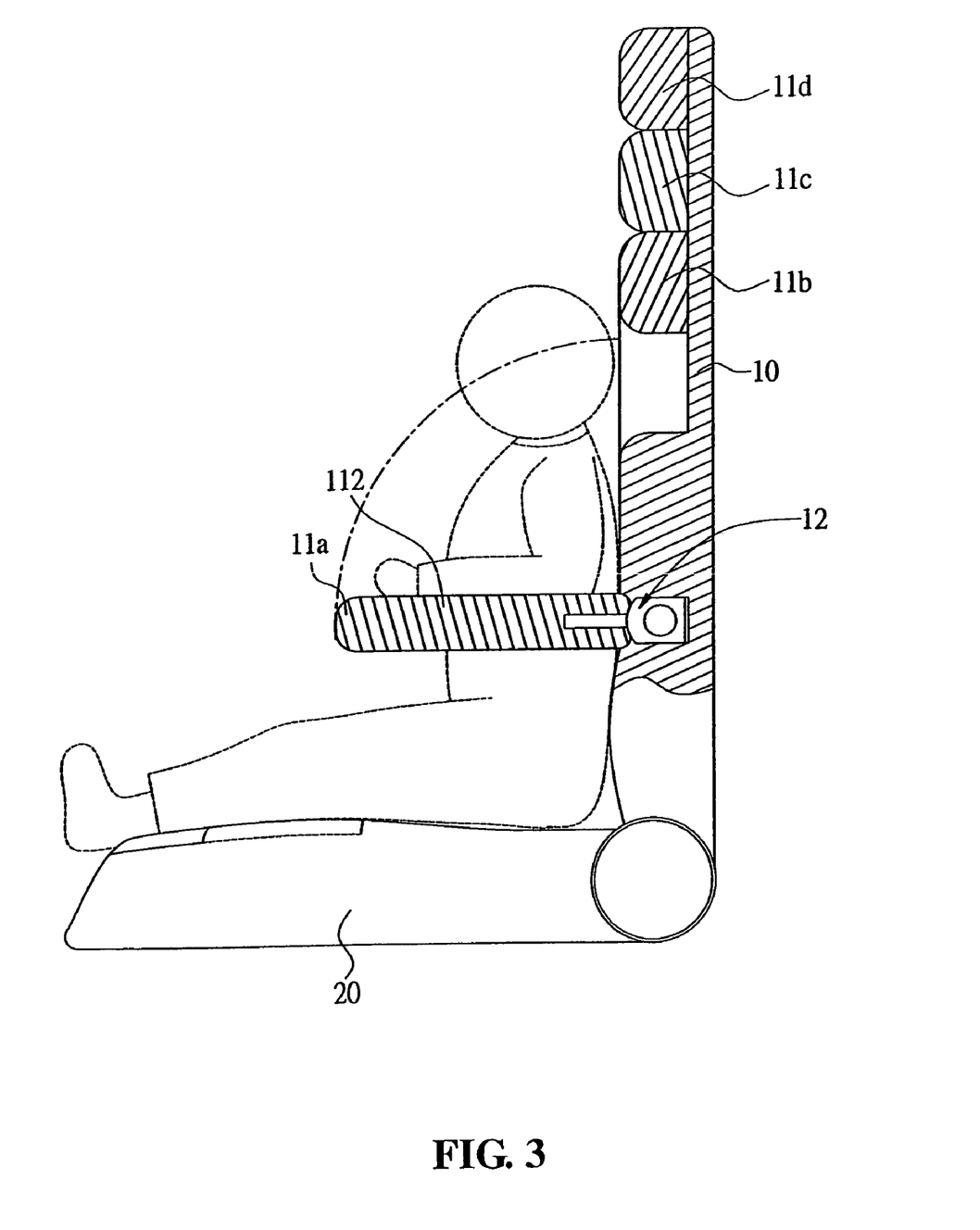
FIG. 3 is a side cross sectional view to show the retaining frame is connected to the backrest by pivotable devices.
Figure 4:
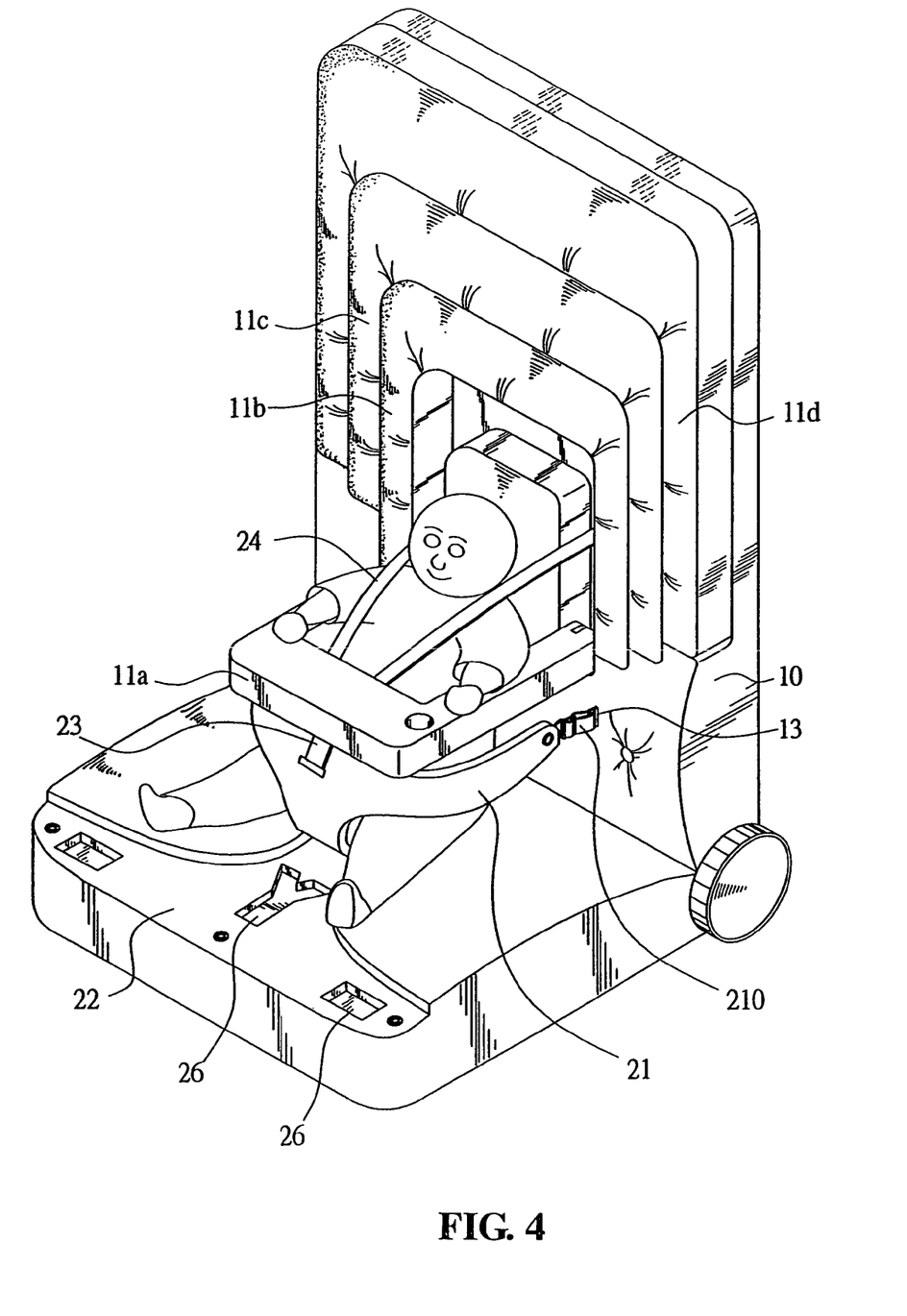
FIGS. 4 to 7 show that four children of different sizes sit in the seat and different retaining frames are respectively used.
Figure 5:
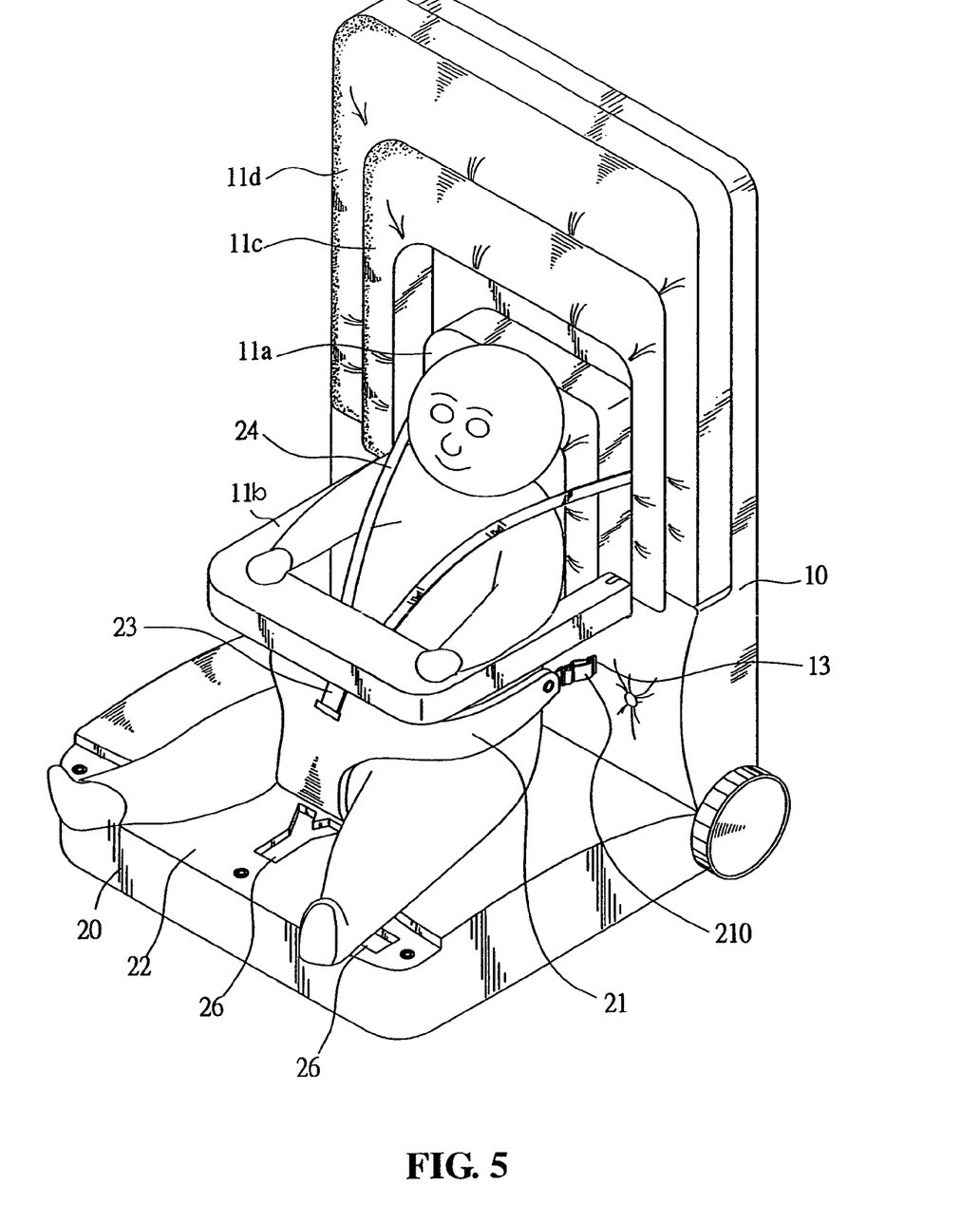
Figure 6:
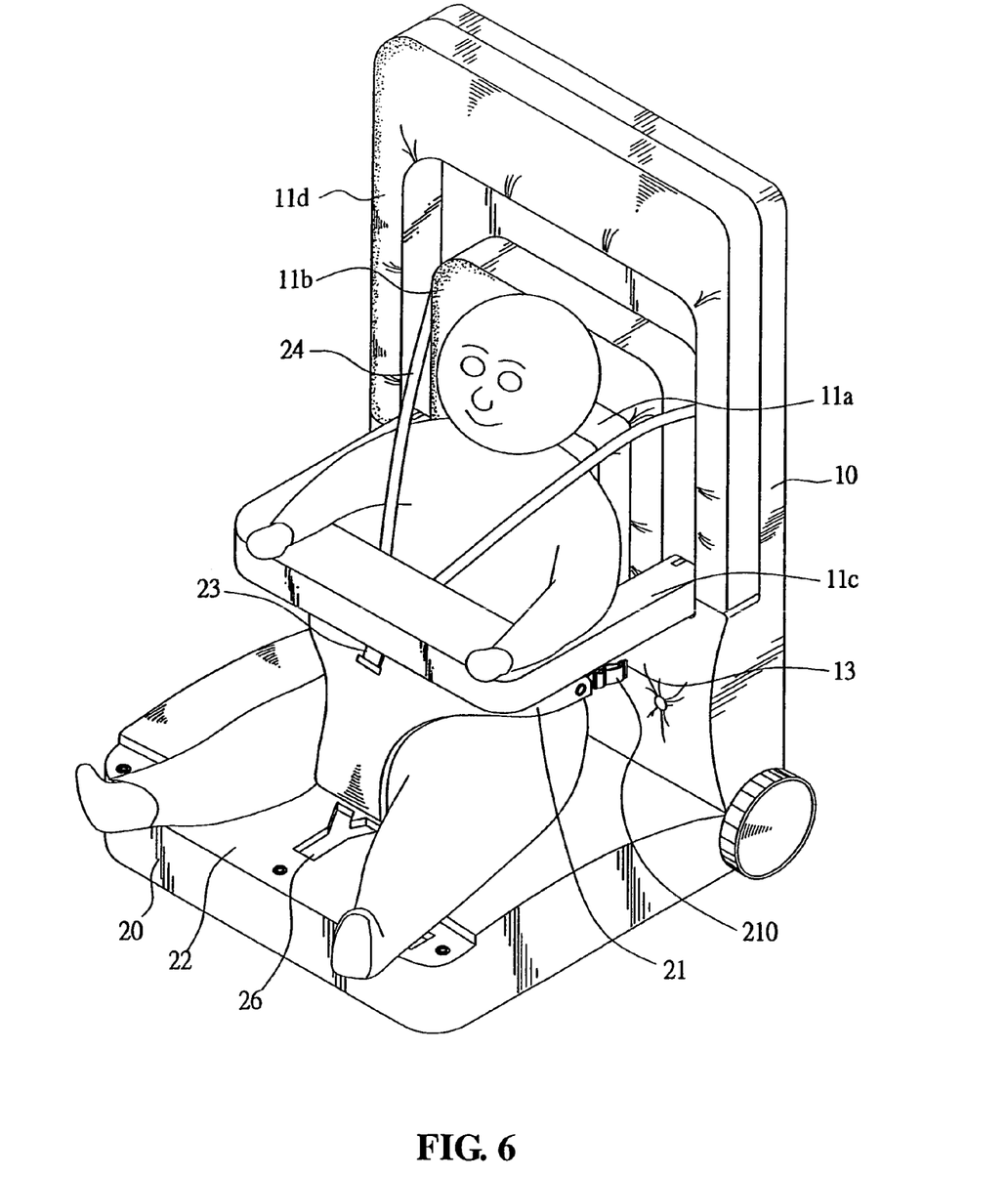
Figure 7:
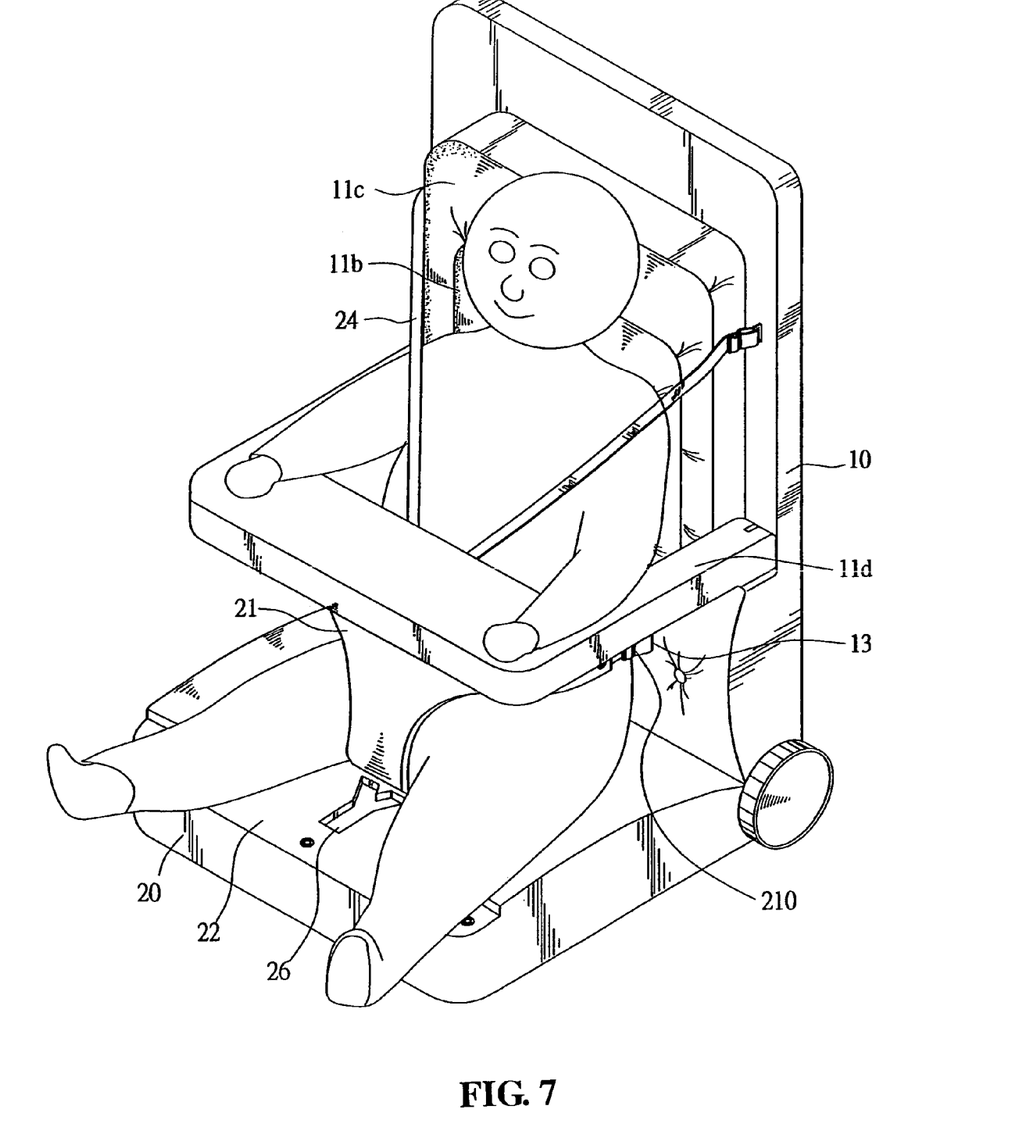

Referring to FIGS. 1 to 3, the seat of the present invention comprises a seat portion 20 and a backrest 10, and a plurality of retaining frames 11a, 11b, 11c and 11d of different sizes are pivotably connected to the backrest 10. The number of the retaining frames can be three or four, in this embodiment, there are four retaining frames 11a, 11b, 11c and 11d. The retaining frames 11a, 11b, 11c and 11d each are composed of a first side rod 110, a second side rod 112 and a transverse rod 111 connected between the two first and second side rods 110, 112, and the retaining frames 11a, 11b, 11c and 11d are sized such that a larger retaining frame encloses a smaller retaining frame so as to form the surface of the backrest 10.

The retaining frames 11a, 11b, 11c and 11d each are pivotably connected to the backrest 10 by joint devices 12 which are connected between the backrest 10 and the first and second side rods 110, 112 so that the retaining frames 11a, 11b, 11c and 11d can be folded and positioned. A Y-shaped positioning belt 21 has one end fixed to the a surface of a recessed area 22 defined in the seat portion 20 and the other two ends are connected with two connection members 210 which are connected to cooperative members on the backrest 10. The positioning belt 21 can be received in the recessed area 22 and is in flush with a surface of the seat portion 20. A positioning piece 23 is connected on the positioning belt 21 and two extension belts 24 extend from the positioning piece 23. Each extension belt 24 has a connection piece 25 which is engaged with one of tow engaging slots 14 in the backrest 10. By the positioning belt 21 and the two extension belts 24, the child can be well positioned in the seat.

Three recesses 26 are defined in the surface of the recessed area 22 in which the positioning piece 23, extension belts 24 and the connection pieces 25 are received when not in use. FIGS. 4 to 7 show four children of different sizes sit in the seat and different retaining frames 11a, 11b, 11c and 11d are respectively used.

Figure 8:
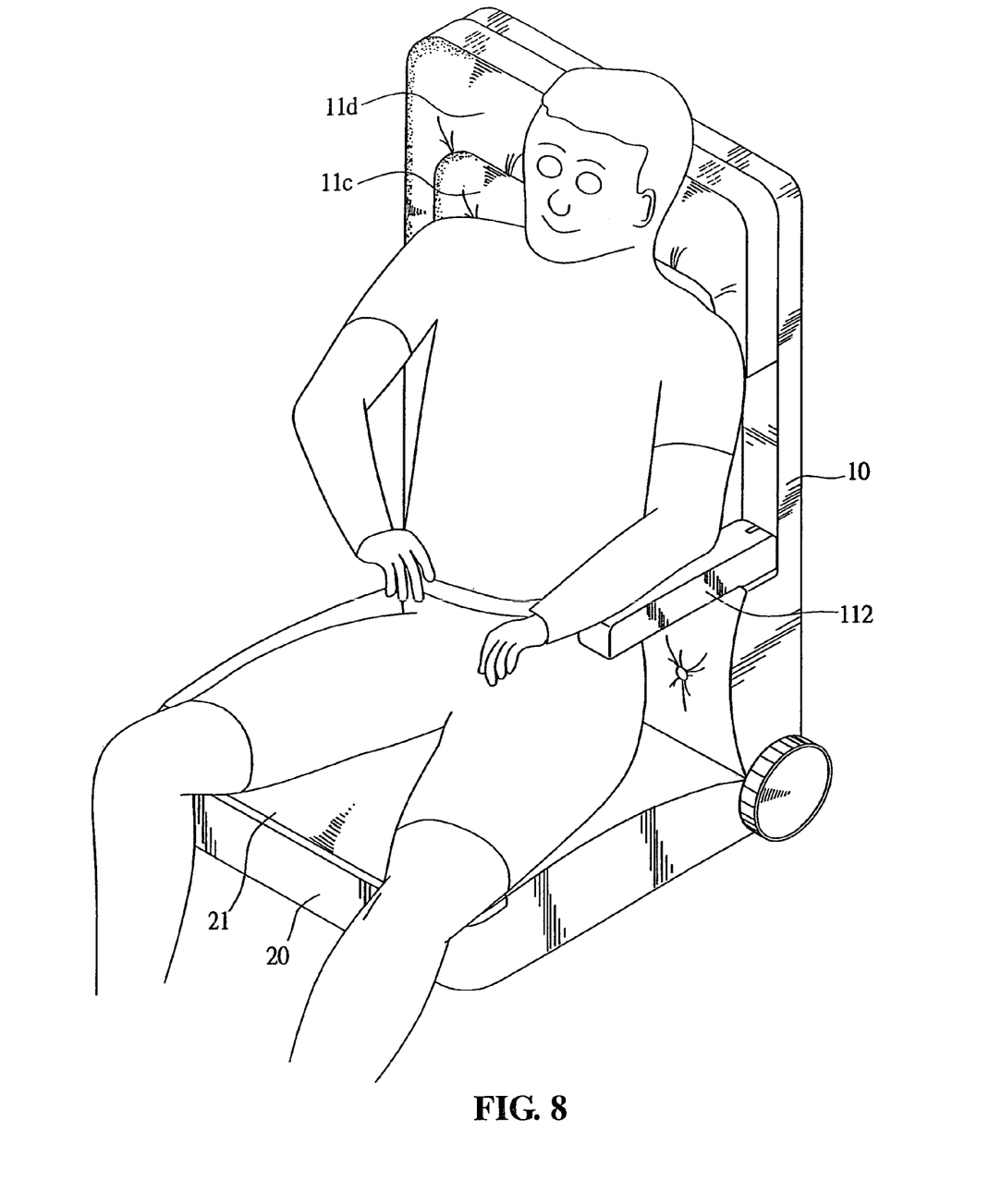
FIG. 8 shows a second side rod is pivoted and used as a armrest.

As shown in FIG. 8, the second side rod 112 has one end pivotably connected to the backrest 10 and the other end of the second side rod 112 is dis-connectable to the transverse rod 111, such that the second side rod 112 can be pivotable away from the backrest 10 and used as an armrest.

While we have shown and described the embodiment in accordance with the present invention, it should be clear to those skilled in the art that further embodiments may be made without departing from the scope of the present invention.

What is claimed is:

1. A seat comprising:

a seat portion and a backrest, a plurality of retaining frames of different sizes being pivotably connected to the backrest, a positioning belt having connection members which are connected to cooperative members on the backrest, and a positioning piece connected on the positioning belt and two extension belts extending from the positioning piece, each extension belt having a connection piece which is engaged with one of two engaging slots in the backrest, and three recesses defined in the seat portion and the positioning piece, extension belts and the connection pieces received in the recesses.

2. The seat as claimed in claim 1, wherein the number of the retaining frames is three.

3. The seat as claimed in claim 1, wherein the number of the retaining frames is four.

4. The seat as claimed in claim 1, wherein the retaining frames are sized such that a larger retaining frame encloses a smaller retaining frame.

5. The seat as claimed in claim 1, wherein the retaining frames each are composed of a first side rod, a second side rod and a transverse rod connected between the two first and second side rods.

6. The seat as claimed in claim 5, wherein the second side rod has one end pivotably connected to the backrest and the other end of the second side rod is dis-connectable to the transverse rod.

7. The seat as claimed in claim 1, wherein the second side rod is pivotably connected to the backrest by a joint device.

8. The seat as claimed in claim 1, wherein the retaining frames each are pivotably connected to the backrest by joint devices.

9. The seat as claimed in claim 1 further comprising a recessed area defined in the seat portion and the positioning belt received in the recessed area, the positioning belt in the recess being in flush with a surface of the seat portion.

* * * * *